Figure 1:
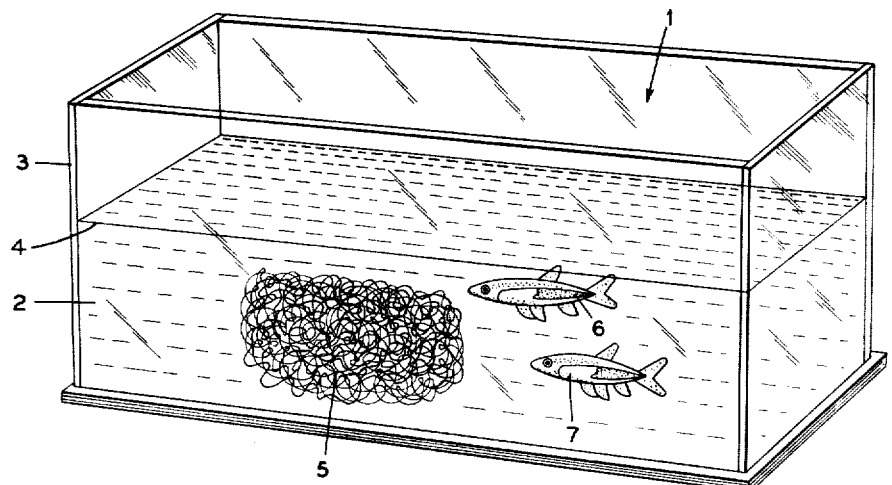

April 2, 1963     R. S. THORSELL ETAL     3,083,686

PROCESS AND APPARATUS FOR THE PROPAGATION OF TROPICAL FISH

Filed May 11, 1961

INVENTORS:
RICHARD S. THORSELL
EDWARD W. PIETRUSZA
BY

ATTORNEY 3,083,686
PROCESS AND APPARATUS FOR THE PROPAGATION OF TROPICAL FISH
Richard S. Thorsell, Dover Township, Morris County, and Edward W. Pietrusza, Morris Township, Morris County, N.J., assignors to Allied Chemical Corporation, New York, N.Y., a corporation of New York
Filed May 11, 1961, Ser. No. 109,401
9 Claims. (Cl. 119—3)

This invention relates to a process and apparatus for carrying out the propagation of small fish, more particularly, of tropical fish of the so-called exotic type.

The propagation of fish, especially of fresh water, ornamental tropical fish for stocking home aquariums, has recently developed into a large commercial enterprise.

In propagating such fish, a spawning medium is usually placed in a tank of water and the fish are induced to spawn on or within the medium which must be such as to retain the eggs thereon and loosely to envelop them thus preventing them from falling to the bottom of the tank and protecting them from predators including the cannibalistic parents.

Various spawning media have been used in the past including such natural plant material as Spanish Moss, Frontinalis, Nitella and the like. Such natural materials are unsatisfactory in commercial breeding plants for a number of reasons; for example, they are difficult or impossible to sterilize effectively, resulting in pollution and consequent loss of parents and young. Some of the mosses and plants are quite expensive and the supply is uncertain. Some of the best spawning media such as Spanish Moss have sharp ends which tend to injure such fish as must swim through the moss to spawn, for example, the barbs, panchax, etc.

It is an object of the present invention to provide a spawning tank equipped with an artificial spawning medium which has all of the advantages of the natural medium and none of its disadvantages.

It is a further object of the invention to provide an improved process for propagating small, fresh water, aquarium fish.

Other objects will appear as the description proceeds.

These and other objects are accomplished according to our invention wherein a spawning tank, which can be of any desired conventional size and material, at least partially filled with water, has positioned therein a loosely matted, tangled mass of random coiled heavy denier, freefall, continuous filamentary material such as nylon filaments, the said tangled mass being of such dimensions and having its filaments spaced apart at distances at least sufficiently large to permit passage of the spawned eggs into the body of the mass, and small enough so that the major portion of the eggs will be caught and retained upon the filaments before passing completely through the mass. In the case of fish which swim through the tangle to deposit their eggs the spaces between the filaments should be at least as large as the largest cross section of the fish in question. In the case of those fish which spawn above the tangle, the individual filaments may be massed more closely together. In any event, the mass should preferably present a multiplicity of open spaces between the filaments having cross-sectional diameter of between about 0.10 centimeter and about 4 centimeters.

Figure 2:
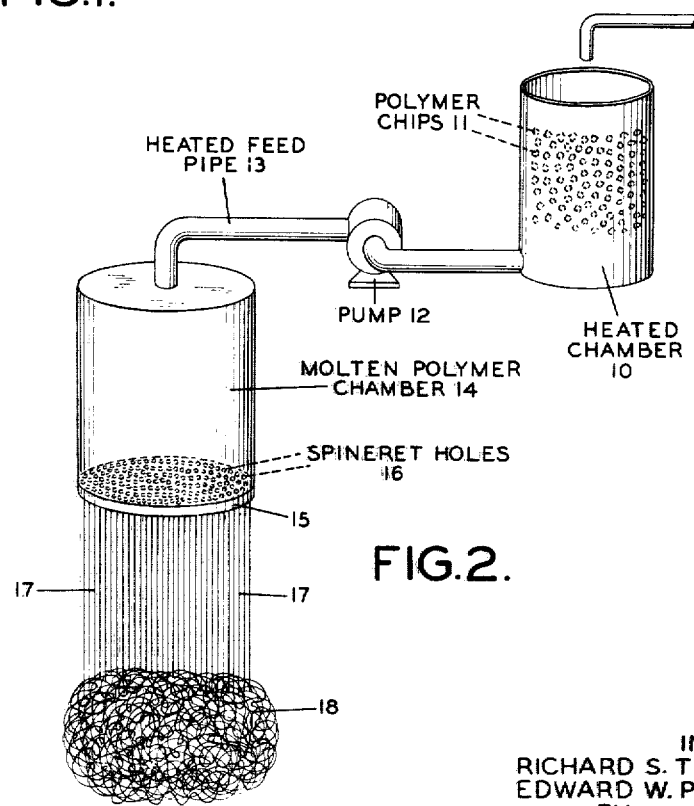

In the drawings, FIGURE 1 represents a spawning tank of the type often utilized in commercial hatcheries for the propagation of tropical fish. FIGURE 2 illustrates a method for producing the tangled mass of continuous filament fibre spawning medium used in our invention.

In FIGURE 1, the numeral 1 represents a conventional fish spawning tank which may be of any desired shape and dimensions, for example, a rectangular tank 20 inches long by 10 inches wide by 12 inches deep, and may have glass sides 2, held together with metal edges 3, or may be entirely of glass. The tank as shown is filled about half full or less of water 4, e.g. to a depth of usually about 5 inches in a tank of the dimensions given above. Spawning medium 5, rests lightly on the bottom of the tank or floats submerged as shown, as the density of the synthetic continuous filaments that makes up the tangle is usually very close to that of water. Shown approaching the spawning medium are a pair of fish, the female 6 and the male 7.

In FIGURE 2, showing the preparation of the filamentary mass, numeral 10 represents a heated chamber to which a supply of solid material such as polymer chips 11, to be spun into filaments, may be fed, from a source not shown. A pump 12 forces molten polymer through heated pipe 13 to spinnerette chamber 14 maintained under pressure and equipped with perforated plate 15 having therein holes 16 of a size to produce the desired filament denier when the molten polymer is forced therethrough. Filament streams are shown at 17 emerging from spinnerette holes 16 and falling free through a distance sufficient to cause congealing of the filament, onto a collecting surface whereon they collect in a random mass 18 of reversed and twisted coils which soon become entwined into a tangled mat.

The spawning medium used in our invention may be composed of heavy denier continuous filaments of any suitable synthetic polymeric material such as nylon, polyethylene, polypropylene, "Dacron" polyester filaments or of glass filaments. Nylon-6 (polycaprolactam) filaments are preferred. The individual filaments must be of relatively large denier, as the finer denier tends to bulk when wet, and drop to the bottom of the tank. It also tends to encase the eggs so tightly as to make it difficult to transfer them to another tank conveniently without damage to the eggs. Denier of at least about 100 is necessary, and may be as high as about 3,000, deniers between 300 and 2,000 being preferred. The standard term denier denotes the weight in grams of 9,000 meters of the filament. The individual filaments are undrawn and may be of any desired cross-section shape e.g. circular, oval, rectangular, triangular, hexagonal, cruciform, etc. cross sections are suitable.

The character of the randomly coiled, tangled mass is such that the filaments retain their character as a cohesive tangled mass, but which, by virtue of their resilience, may be pulled apart or compacted somewhat to vary the spacing between the individual fibres. While the polymeric filaments themselves have densities close to 1, (nylon and "Dacron" being slightly higher than 1, e.g. nylon about 1.1, "Dacron" about 1.4 and polyethylene and polypropylene being slightly less than 1, e.g. polyethylene about 0.92–0.96 and polypropylene about 0.90) nevertheless in general the bulked filament mass will usually have a bulk density of between about 0.1 and about 0.5 gram per cubic inch.

The randomly tangled or intermeshed mass may be used directly as it is obtained from the free-falling filaments as they collect and mesh beneath the spinnerette, or they may be delustered and/or dyed if desired. We have found that in general the exotic tropical fish spawn readily on the tangled mass of almost any color (except possibly violet) including natural white, green, brown, orange, pink, yellow, blue, etc. For esthetic reasons, green, brown and natural aquamarine (blue-green) are preferred, and delustering of the filaments appears to promote spawning to some extent. In the case of live bearers the spawning medium serves as a refuge for the young and even though the interstices may be larger than the cross-section of a parent, the medium reduces the parent's mobility so that the young are afforded a considerable degree of safety.

The breeding tanks of our invention are suitable for use in the propagation of all types of small fish, e.g. below about 6 inches in length, usually between about ½ inch and about 4 inches, and are especially useful in propagation of small exotic tropical fish under unnatural conditions, such as exist in commercial hatcheries. These so-called exotics, usually of brilliant colors and unusual markings, are especially sensitive to small changes in conditions and are difficult to breed in a foreign atmosphere. Thus exotics of the classes known as egg scatterers e.g. the characins which include the "tetras"; and Carps which include the "barbs," as well as the so-called live bearers, including the guppies, platys, swordtails and half-beaks, may be readily bred in the breeding tanks of our invention.

In carrying out the propagation, a matched pair of fish, in condition for spawning, are introduced into a waterproof tank, preferably a glass tank, filled to a depth of at least about 3 inches, with water of the appropriate temperature and pH, for the particular species involved, having positioned in the water a mass of the spawning medium made up of a continuous filament yarn of a denier suited to the size and habits of the particular fish introduced. For example, the characins are relatively small, and are of the type that spawn above the medium, so that a smaller denier filament mass e.g. 300–400 denier is suitable for this class. On the other hand, the "barbs" as a class swim through the interstices in the medium to spawn, so that for these a mass of larger denier filaments, e.g. 1500 or more is preferred.

After spawning and fertilization are accomplished, usually in a period of about 18 or more hours, the parents are removed. The eggs may either be left in the spawning tank to hatch or may be transferred to a more suitable hatching tank, by gentle lifting out of the spawning medium, and then shaking the eggs free into the hatching tank.

The following specific examples further illustrate our invention.

EXAMPLES 1–6

Twenty-four spawning tanks of ten gallons capacity were set up, containing approximately six gallons of water at 80° F. with a pH of 6.5 and a degree of hardness of 4. Into each of twenty tanks was placed about 20 grams of a randomly coiled tangled mass of free-fall nylon–6 of the denier and color indicated in Table I to form a loose mass of about 72 cubic inches in bulk. Four of the tanks were provided with a similar bulk of Frontinalis natural plant spawning medium as a control. Into each tank then was introduced a pair of Sumatrian barbs in condition ready for spawning.

Four replications of each of six tests were made with different deniers of nylon filament, differently treated and/or dyed, and with the control, results of which tests are shown in the table below.

*Table I*

| Test Run | Spawning Medium | Estimated Number of Eggs/Tank | | | | Total No. of Eggs |
|---|---|---|---|---|---|---|
| | | #1 | #2 | #3 | #4 | |
| 1 | Bright-Undyed 503 Den. Fils. | 0 | 0 | 50 | 125 | 175 |
| 2 | Delustered-Undyed (TiO₂) 388 Den. Fils. | 0 | 75 | 0 | 40 | 115 |
| 3 | Bright-Dyed ¹ 1525 Den. Fils. | 30 | 0 | 14 | 30 | 74 |
| 4 | Bright-Dyed ¹ 503 Den. Fils. | 0 | 50 | 15 | 200 | 265 |
| 5 | Delustered-Dyed ¹ 388 Den. Fils. | 150 | 30 | 150 | 150 | 470 |
| 6 | Frontinalis (Control) | 50 | 125 | 150 | 0 | 325 |

¹ 0.5% Alizarine Cyanone Green G-Extra.

EXAMPLE 7

A set of experiments was carried out in a manner similar to that described in the foregoing examples to test the effect of spawning of various colors of nylon–6 mass. In these tests samples of delustered 388 denier nylon–6 filaments dyed respectively pink, a brilliant fluorescent red, violet and an earthy brown were used, together with the green dyed material of Example 5 and the Frontinalis of Example 6 above. The fish spawned readily upon all the colored filaments with the exception of violet.

EXAMPLE 8

Spawning tests similar to those described in the foregoing examples but using a delustered, green heavy denier (300–400) tangled filament nylon–6 mass were carried out using pairs of the fish listed below with the result that all spawned satisfactorily and prolifically on the spawning media provided.

1. Glow-lites—*Hyphessobrycon gracilis*
2. Pulchers—*Hemigrammus pulcher*
3. Head and Tail Lights—*Hemigrammus ocellifer*
4. Penguins—*Thayeria oblique*
5. Scissor Tails—*Rasbora trilineata*
6. Nigger Barbs—*Barbus nigrofasciatus*
7. Sumatrian Barbs—*Barbus tetrazona*
8. Cherry Barbs—*Barbus titteza*
9. White Clouds—*Tanichthys albonubes*
10. Australian Rainbows—*Melanotaenia nigrans*
11. Guppy—*Lebistes reticulatus*

Of the above species numbers 1–10 illustrate the egg scatterers, number 11 the live bearers.

While the above describes the preferred embodiments of our invention, it will be understood that departures may be made therefrom within the scope of the specification and claims.

The spawning media of the invention are far more durable than vegetable media and are free from any tendency to pollute or cloud the water.

We claim:

1. A spawning medium comprising a mass of loosely tangled continuous undrawn 100–3000 denier synthetic polymeric filaments, having a bulk density between about 0.1 and about 0.5 gram per cubic inch.

2. A spawning medium of claim 1, wherein said filaments are delustered nylon filaments.

3. A spawning medium of claim 2 wherein said filaments are uncoated nylon filaments.

4. A spawning tank adapted for the propagation of small, ornamental tropical fish comprising a waterproof container containing water to a depth of at least about 3 inches, and containing, at least partially submerged in said water, a mass of at least about 8 cubic inches in bulk of a spawning medium consisting essentially of a loosely matted, tangled mass of random coiled, undrawn continuous filaments synthetic polymeric having a denier between about 100 and about 3,000.

5. A spawning tank according to claim 4 wherein the filaments in the spawning medium are free-fall filaments having a denier between about 300 and about 2,000.

6. A spawning tank according to claim 5 wherein the spawning medium is composed of delustered nylon filaments.

7. A spawning tank according to claim 6 wherein the spawning medium is composed of delustered, green, uncoated nylon filaments.

8. A process for propagating small tropical fish of the "exotic" type which comprises introducing a matched pair of such fish, in condition for spawning, into a tank containing water to a depth of between about 3 inches and about 10 inches, said water having submerged therein a mass of at least about 8 cubic inches in bulk, of a spawning medium consisting essentially of a loosely matted, tangled mass of random coiled, continuous filaments synthetic polymeric having a denier between about 100 and about 2,000, and allowing said fish to remain in said tank until spawning is accomplished.

9. The process according to claim 8 wherein the filamentary mass is composed of nylon filaments and the filaments in the spawning medium have a denier between about 300 and about 2,000.

References Cited in the file of this patent

UNITED STATES PATENTS 2,841,113    Ebert _____ July 1, 1958

OTHER REFERENCES

Exotic Aquarium Fishes, William T. Innes, published by William T. Innes Publishing Company, Philadelphia, Pa.

Keeping and Breeding of Aquarium Fishes, by Emmens, T.F.H. publication, 57 Academy St., Jersey City 2, N.J.

UNITED STATES PATENT OFFICE
CERTIFICATE OF CORRECTION

Patent No. 3,083,686 April 2, 1963

Richard S. Thorsell et al.

It is hereby certified that error appears in the above numbered patent requiring correction and that the said Letters Patent should read as corrected below.

Column 4, line 4, for "of", first occurrence, read -- on --; same line 4, after "of", third occurrence, insert -- a --; same column 4, line 58, and column 5, lines 1 and 2, for "continuous filaments synthetic polymeric", each occurrence, read -- continuous synthetic polymeric filaments --.

Signed and sealed this 3rd day of December 1963.

(SEAL)
Attest:

ERNEST W. SWIDER
Attesting Officer

EDWIN L. REYNOLDS
Acting Commissioner of Patents